United States Patent Office 3,083,205
Patented Mar. 26, 1963

3,083,205
ALKANOYLAMINO AND ALKOXYCARBONYL-
AMINO DERIVATIVES OF 1-(AROYLALKYL)-4-
ARYLPIPERIDINES
Paul A. J. Janssen, Vooselaar, near Turnhout, Belgium, assignor to Research Laboratorium Dr. C. Janssen, N.V., Beerse, Belgium, a company of Belgium
No Drawing. Filed June 13, 1961, Ser. No. 116,684
Claims priority, application Great Britain Aug. 3, 1960
9 Claims. (Cl. 260—294)

The compounds of this invention are 1-(aroylalkyl)-4-arylpiperidines of the general structural formula

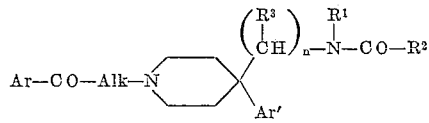

and the pharmaceutically useful salts thereof wherein Ar is a member of the class consisting of phenyl, halophenyl, methoxyphenyl and thienyl; Ar' is a member of the class consisting of phenyl, halophenyl and tolyl; Alk is an alkylene radical of from 2 to 4 carbon atoms inclusive; $R^1$ and $R^3$ are members of the class consisting of hydrogen and lower alkyl radicals; $R^2$ is a member of the class consisting of hydrogen, lower alkyl and lower alkoxy radicals; and $n$ is an integer between 0 and 1 inclusive.

The halophenyl radicals referred to above can be fluorophenyl, chlorophenyl, bromophenyl and iodophenyl. The lower alkyl and lower alkoxy radicals referred to above are methyl, ethyl, n-propyl, isopropyl, methoxy, ethoxy, propoxy, isopropoxy, and like lower alkyl and lower alkoxy radicals containing less than 7 carbon atoms. In the above formula, trimethylene is the preferred embodiment for Alk although Alk can also represent radicals such as ethylene and tetramethylene.

The compounds of this invention can be prepared by the condensation of an aroylalkyl halide of the general formula Ar-CO—Alk-Halogen wherein Ar and Alk are defined as above with an appropriately selected piperidine derivative of the formula

wherein Ar', $n$, $R^1$, $R^2$, and $R^3$ are defined as above. The reaction can be carried out in an inert solvent such as an aromatic hydrocarbon, for example, benzene, toluene, and xylene; a lower alkanol, for example, ethanol, propanol and butanol; or a lower alkanone, for example acetone, butanone, and pentanone. In certain cases the reaction may be usefully accelerated by elevated temperatures and pressures.

To obtain the intermediate piperidines described above the most convenient starting material is a 1-benzyl-4-cyano-4-arylpiperidine. This piperidine can be hydrogenated over Raney nickel in methanol in the presence of ammonia to give an amine of the formula

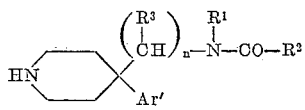

This amine can be reacted with the appropriate alkyl chloroformate in pyridine to give the corresponding carbamate, with trichloroacetaldehyde in chloroform to give the corresponding formamide, or with the anhydride of an appropriate acid in anhydrous benzene to give the corresponding amide. The resulting compounds are then debenzylated to the desired piperidines by hydrogenation over palladium-on-charcoal catalyst in ethanol at atmospheric pressure and room temperature.

Alternately, the 1-benzyl-4-cyano-4-phenyl-piperidine described above can be partially hydrolyzed to the corresponding amide by refluxing the nitrile with sulfuric acid. The resultant amide, which has the formula

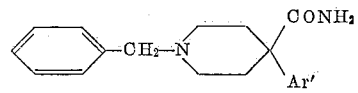

is then mixed with sodium and an appropriate lower alkanol, and bromine is added. This gives a carbamate of the formula

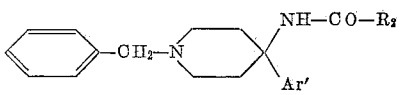

wherein $R^2$ is lower alkoxy and Ar' is defined as above. This carbamate can be debenzylated by the method described above or it can be hydrolyzed to the corresponding 4-aminopiperidine by heating the carbamate in diethylene glycol with potassium hydroxide. The resulting amine can then be reacted with an appropriate alkyl chloroformate, with trichloroacetaldehyde, or with an appropriate anhydride and then debenzylated in the same manner as the 4-aminomethylpiperidines described above.

The organic bases of this invention form pharmaceutically acceptable salts with a variety of inorganic and strong organic acids including sulphuric, phosphoric, hydrochloric, hydrobromic, hydriodic, sulphamic, citric, lactic, maleic, malic, succinic, tartaric, cinnamic, acetic, benzoic, gluconic, ascorbic, and related acids. They also form quaternary ammonium salts with a variety of organic esters of sulphuric, hydrohalic, and aromatic sulphonic acids. Among such esters are methyl chloride and bromide, ethyl chloride, propyl chloride, butyl chloride, isobutyl chloride, phenylethyl bromide, naphthylmethyl chloride, dimethyl sulphate, diethyl sulphate, methyl benzenesulphonate, ethyl toluenesulphonate, ethylene chlorohydrin, allyl bromide, methallyl bromide and crotyl bromide.

The compounds of this invention have useful pharmacological properties. In particular, they produce hypotension of long duration. They are powerful inhibitors of the peripheral effects of epinephrine and of nor-epinephrine. They also specifically inhibit the ortho-sympathetic nervous system. The properties are indicative of a novel mechanism of action. Safety and effectiveness in human beings has not been established at this time.

The compounds which constitute this invention and the methods for their preparation will appear more fully from a consideration of the following examples which are given for the purpose of illustration only and are not to be construed as limiting the invention in spirit or in scope. In these examples quantities are indicated in parts by weight, temperatures are expressed in degrees centigrade (° C.) and pressures are expressed in millimeters of mercury (mm.).

Example 1

To a mixture of 119 parts of N,N-($\beta,\beta'$-dihydroxy)-diethyl amine and 54 parts of 2-N sodium carbonate are added 190.5 parts of 4-toluenesulfonyl chloride. This mixture is heated to about 95° C. for about one hour and then cooled to 0° C. and filtered. The filtrate is extracted with ether. After evaporation of the ether, the residue is crystallized from a mixture of 2-propanol and petroleum ether by chilling at −20° C., and then recrystallized from a 1:3 by volume mixture of ethanol and acetone to yield N-(4-toluenesulfonyl)-N,N-($\beta,\beta'$- dihydroxy)diethyl amine. A mixture of this compound and 690 parts of thionyl chloride is heated gently at 125° C. for about an hour and then cooled. The excess thionyl chloride is evaporated and the residue is purified by crystallization from dry toluene to yield N-(4-toluene-sulfonyl)-N,N-(β,β'-dichloro)diethyl amine.

To a solution of 592.5 parts of this compound and 270 parts of 4-fluorophenylacetonitrile in 2000 parts of dry toluene are added portionwise 345 parts of a 50% suspension by weight of sodamide in xylene while the temperature is mainatined at about 45–50° C. After the initial reaction has subsided, the mixture is heated slowly to boiling and then refluxed for 2 hours. After cooling, water is added to decompose the mixture. The precipitate is collected, washed with 2-propanol, and dried to yield 1-(4-toluenesulfonyl)-4-cyano-4-(4-fluorophenyl)piperidine melting at about 186.5–188° C.

A mixture of 139 parts of 1-(4-tosyl)-4-cyano-4-(4-fluorophenyl)piperidine, 110 parts of phenol and 1000 parts of 30% hydrogen bromide in acetic acid is heated for 18 hours at 40° C. with stirring. The reaction mixture is poured into a mixture of 1600 parts of ether and 1000 parts of water. The ether solution is separated and extracted with water. The combined aqueous solutions are alkalized and extracted with chloroform. The chloroform is dried over magnesium sulfate and concentrated to ½ the original volume. The mixture is filtered to remove precipitated solid and the filtrate is evaporated to dryess. The residue is dissolved in diisopropyl ether and hydrogen chloride gas is introduced to the solution. This precipitates 4-cyano-4-(4-fluorophenyl)piperidine hydrochloride melting at about 241.5–247° C.

An aqueous solution of 100 parts of 4-cyano-4-(4-fluorophenyl)piperidine hydrochloride is alkalized and extracted with toluene. The toluene layer is dried over magnesium sulfate and mixed with 320 parts of toluene and 132 parts of sodium carbonate. The mixture is heated to reflux and a solution of 52 parts of benzyl chloride in 80 parts of toluene is added portionwise. The mixture is refluxed for 5 hours before it is filtered and the solvent is evaporated. The residue is dissolved in 240 parts of diisopropyl ether and cooled to −20° C. to precipitate unreacted 4-cyano-4-(4-fluorophenyl)piperidine hydrochloride. The solid is filtered and the filtrate is diluted with 400 parts of diisopropyl ether. Introduction of hydrogen chloride gas into the solution gives 1 - benzyl - 4 - cyano - 4 - (4 - fluorophenyl)piperidine hydrochloride melting at about 237.8–247° C.

If an equivalent quantity of 4-iodophenylacetonitrile is substituted for 4-fluorophenylacetonitrile and the above procedure is repeated, the product is 1-benzyl-4-cyano-4-(4-iodophenyl)piperidine hydrochloride.

Example 2

403 parts of N-benzyl-N,N-bis(2-chloroethyl)amine hydrochloride is dissolved in 1500 parts of water and alkalized with solid potassium carbonate. The mixture is extracted with toluene and the toluene extract is dried over potassium carbonate, filtered and concentrated to about 500 parts. To this residue is added a solution of 200 parts of 4-methylphenylacetonitrile in 560 parts of anhydrous toluene. The mixture is stirred and 150 parts of sodamide are added portionwise while the temperature is maintained at about 40° C. by external cooling. After the addition is complete, the mixture is refluxed for 5 hours. The mixture is cooled to 5° C. in an ice bath and decomposed with water. The water layer is alkalized and extracted with toluene. The combined toluene solutions are poured into 3500 parts of 6 N hydrochloric acid. The precipitated solid is filtered and sucked dry before recrystallization from methanol. This gives 1 - benzyl - 4 - cyano - 4 - (4 - tolyl)piperidine hydrochloride melting at about 281.6–282.9° C.

Substitution of an equivalent quantity of 3 - methylphenylacetonitrile for the 4-methylphenylacetonitrile in the above procedure gives 1-benzyl-4-cyano-4-(3-tolyl)-piperidine hydrochloride melting at about 245–246° C.

Example 3

A mixture of 40 parts of 1-benzyl-4-cyano-4-phenylpiperidine, 150 parts of sulfuric acid and 8 parts of water is refluxed for 3 hours. The reaction mixture is cooled and poured into ice water. The solution is alkalized with concentrated ammonium hydroxide and extracted with 560 parts of chloroform. The organic solution is dried over sodium sulfate and the solvent is evaporated. The residue is recrystallized from 2-propanol to give 1-benzyl-4-carbamyl-4-phenylpiperidine melting at about 117.4–118.4° C.

To a solution of 35 parts of 1-benzyl-4-carbamyl-4-phenylpiperidine hydrobromide and 30 parts of sodium methoxide in 208 parts of methanol is added 24 parts of bromine over a period of 10 minutes with stirring. The mixture is heated for 10 minutes on a water bath and then rendered just acid with acetic acid. After evaporation of the solvent, the residue is washed with 100 parts of water. The aqueous layer is extracted with 120 parts of chloroform. The chloroform is dried over magnesium sulfate and the solvent is evaporated. The residue is recrystallized from 2-propanol to give 1-benzyl-4-methoxycarbonylamino-4-phenylpiperidine hydrobromide melting at about 235° C. with decomposition.

If sodium ethoxide and ethanol are substituted for the sodium methoxide and methanol, and the procedure in the above paragraph is repeated, the product is 1-benzyl-4-ethoxycarbonylamino-4-phenylpiperidine hydrobromide melting at about 184–187° C.

By substituting an equivalent quantity of 1-benzyl-4-cyano-4-(4-iodophenyl)piperidine for the 1-benzyl-4-cyano-4-phenylpiperidine and repeating the above procedure there is obtained 1-benzyl-4-methoxycarbonylamino-4-(4-iodophenyl)piperidine.

Example 4

A mixture of 6 parts of 1-benzyl-4-methoxycarbonylamino-4-phenylpiperidine, 45 parts of diethylene glycol, 5.5 parts of water and 5.5 parts of potassium hydroxide is stirred and heated at 150–160° C. for 1 hour. After cooling the reaction mixture, 30 parts of water is added. The mixture is extracted once with 40 parts of benzene and twice with 40 parts of diisopropyl ether. The organic solutions are combined, dried over magnesium sulfate and filtered. Hydrogen chloride gas is introduced into the filtrate. Recrystallization of the product from a mixture of absolute ethanol and methanol gives 1-benzyl-4-amino-4-phenylpiperidine dihydrochloride melting at about 225–230° C.

Example 5

To a suspension of 117 parts of 1-(4-tosyl)-4-cyano-4-phenylpiperidine in 400 parts of tetrahydrofuran is added portionwise 15.8 parts of lithium aluminum hydride over a period of 50 minutes. The mixture is refluxed for 2 hours and then stirred an additional hour at room temperature. The cooled reaction mixture is decomposed by the careful addition of 100 parts of water followed by 200 parts of concentrated hydrochloric acid. The mixture is filtered. The aqueous layer is separated from the filtrate and a precipitate which forms is filtered off and dissolved in water. The aqueous solution is alkalized and extracted with chloroform. The organic layer is separated and dried and the solvent is evaporated. The residue is recrystallized from ether to give 1-(4-tosyl)-4-aminomethyl-4-phenylpiperidine melting at about 116–117° C.

To a stirred solution of 34.5 parts of 1-(4-tosyl)-4-aminomethyl-4-phenylpiperidine in 160 parts of benzene is added portionwise a solution of 15.5 parts of acetic anhydride in 40 parts of benzene. The mixture is then stirred at room temperature for 30 minutes before it is heated to 60° C. After cooling and stirring at room temperature for an additional 25 minutes, the mixture is washed with dilute sodium hydroxide solution. The organic layer is separated, dried over magnesium sulfate and the solvent is evaporated. The residue is washed with toluene, filtered and dried to give 1-(4-tosyl)-4-acetamidomethyl-4-phenylpiperidine melting at about 151–152° C.

To a stirred suspension of 1.07 parts of sodamide in 56 parts of toluene is added 9.7 parts of 1-(4-tosyl)-4-acetamidomethyl-4-phenylpiperidine and the mixture is refluxed for 3 hours. The clear solution is cooled and 14.2 parts of methyl iodide is added. Stirring and refluxing is resumed for an additional 3 hours. The cooled reaction mixture is decomposed with water. The organic layer is separated, washed with water and dried over magnesium sulfate. Evaporation of the solvent leaves a residue which crystallizes from toluene. This product is 1-(4-tosyl) - 4 - (N-methyl)acetamidomethyl - 4 - phenylpiperidine melting at about 139–141° C.

A mixture of 46 parts of 1-(4-tosyl)-4-(N-methyl)acetamidomethyl-4-phenylpiperidine, 21.6 parts of phenol and 264 parts of 30% hydrogen bromide in acetic acid is heated for 16 hours at 35–40° C. The reaction mixture is divided between 100 parts of water and 80 parts of diisopropyl ether. The organic layer is separated and washed twice with 50 parts of water. The aqueous layers are combined and washed once with 40 parts of diisopropyl ether. The aqueous solution is separated, alkalized with 40% sodium hydroxide and extracted with chloroform. The extract is dried over magnesium sulfate and the solid is evaporated. The oily residue crystallizes from ether to give 4-(N-methyl)acetamidomethyl-4-phenylpiperidine melting at about 80.6–85° C. with decomposition.

*Example 6*

A mixture of 96.5 parts of 1-benzyl-4-acetyl-4-phenylpiperidine, 93 parts of hydroxylamine hydrochloride, 91 parts of pyridine and 730 parts of ethanol is stirred and refluxed for 3 hours on a steam bath. On cooling the reaction mixture, a solid precipitates. This is filtered off, washed with alcohol and dried to give 1-benzyl-4-(1-hydroxyiminoethyl)-4-phenylpiperidine hydrochloride melting at about 243–245° C.

To a boiling solution of 17.2 parts of 1-benzyl-4-(1-hydroxyiminoethyl)-4-phenylpiperidine hydrochloride in 80 parts of 2-propanol is added portionwise 12 parts of sodium. The mixture is stirred and refluxed until the sodium is completely dissolved. After cooling the mixture to room temperature, 40 parts of water is added. The reaction mixture is filtered from the precipitated solid and the filtrate is concentrated under reduced pressure. The remaining solution is recombined with the solid and the whole is extracted several times with benzene. The combined benzene extracts are dried over magnesium sulfate and the solvent is evaporated to leave an oily residue. This residue is treated with 32 parts of diisopropyl ether. On cooling, unreacted starting material precipitates and is removed by filtration. The filtrate is diluted with 160 parts of diisopropyl ether and hydrogen chloride gas is introduced into the solution. The precipitated solid is filtered and dried to give 1-benzyl-4-(1-aminoethyl)-4-phenylpiperidine dihydrochloride melting at about 215–250° C.

*Example 7*

An aqueous solution of 49 parts of 1-benzyl-4-cyano-4-(4-fluorophenyl)piperidine hydrochloride is alkalized and extracted with toluene. The solvent is evaporated from the dried toluene solution and the residue is dissolved in a solution of 10.7 parts of ammonia in 135 parts of methanol. This solution is placed in a hydrogenation bomb together with 10 parts of Raney nickel catalyst. Hydrogenation is carried out at a pressure of 18 atmospheres and at a temperature of about 50° C. After about 2 hours, no more hydrogen is taken up and hydrogenation is stopped. The mixture is filtered and the solvent is evaporated from the filtrate. The residue is dissolved in 600 parts of diisopropyl ether and hydrogen chloride gas is introduced into the solution. The precipitated hydrochloride is separated by filtration. The product is 1-benzyl-4-aminomethyl-4-(4 - fluorophenyl)piperidine dihydrochloride melting at about 253–256° C.

By substituting equivalent quantities of the appropriate starting materials in the above procedure, the following compounds are obtained:

1-benzyl-4-aminomethyl-4-(3-tolyl)piperidine dihydrochloride melting at about 195° C. with decomposition.

1-benzyl-4-aminomethyl-4-(4-tolyl)piperidine dihydrochloride melting at about 200° C. with decomposition.

*Example 8*

An aqueous solution of 50 parts of 1-benzyl-4-aminomethyl-4-(4-fluorophenyl)piperidine dihydrochloride is alkalized and extracted with toluene. The residue remaining after evaporation of the solvent from the dried toluene solution is dissolved in 165 parts of pyridine. To this solution is added portionwise a solution of 14.65 parts of ethyl chloroformate in 40 parts of ether. The mixture is stirred for 16 hours at room temperature and then heated at 60° for 1 hour. After cooling, the reaction mixture is filtered and the precipitate is dried to give 1-benzyl-4-ethoxycarbonylaminomethyl - 4 - (4 - fluorophenyl)piperidine hydrochloride melting at about 247° C.

If equivalent quantities of the appropriate amine are used in the above procedure, the following compounds are obatined:

1 - benzyl - 4 - ethoxycarbonylaminomethyl - 4 - (3-tolyl)piperidine hydrochloride melting at about 213.5–219° C.

1 - benzyl - 4 - ethoxycarbonylaminomethyl - 4 - (4-tolyl)piperidine hydrochloride melting at about 213–216° C.

1 - benzyl - 4 - propoxycarbonylaminomethyl - 4 - phenylpiperidine hydrochloride melting at about 221–223.6° C.

1 - benzyl - 4 - methoxycarbonylaminomethyl - 4 - phenylpiperidine hydrochloride melting at about 164–170° C.

1 - benzyl - 4 - isopropoxycarbonylaminomethyl - 4 - phenylpiperidine hydrochloride melting at about 249–251° C.

1 - benzyl - 4 - (1 - ethoxycarbonylaminoethyl) - 4 - phenylpiperidine.

*Example 9*

To a cooled solution of 16 parts of 1-benzyl-4-aminomethyl-4-phenylpiperidine in 88 parts of chloroform is added portionwise a solution of 7.85 parts of trichloroacetaldehyde in 55 parts of chloroform. The mixture is stirred at room temperature for 14 hours and then for 30 minutes on a steam bath. Evaporation of the solvent leaves a residue which is stirred in the cold with 120 parts of ether. The precipitate is filtered off to give 1-benzyl-4-formamidomethyl-4-phenylpiperidine melting at about 119.5–121° C.

*Example 10*

An aqueous solution of 37 parts of 1-benzyl-4-aminoethyl-4-(3-tolyl)piperidine dihydrochloride is alkalized and extracted with chloroform. Evaporation of the solvent from the chloroform solution leaves an oily residue which is dissolved in 120 parts of anhydrous benzene. A solution of 13.8 parts of acetic anhydride in 40 parts of anhydrous benzene is added. The mixture is stirred for 1 hour at room temperature and then is alkalized with sodium hydroxide. The organic layer is dried over magnesium sulfate and the solvent is evaporated. The residue is recrystallized from toluene to give 1-benzyl-4-acetamidomethyl-4-(3-tolyl)piperidine melting at about 144.5–146°

C. To obtain the hydrochloride, hydrogen chloride gas is passed through a diisopropyl ether solution of the product.

By substituting equivalent quantities of the appropriate starting materials in the above procedure, the following compounds are obtained:

1 - benzyl - 4 - acetamido - 4 - phenylpiperidine melting at about 174.5–176.5° C.

1 - benzyl - 4 - acetamidomethyl - 4 - (4 - fluorophenyl)-piperidine melting at about 111.8–113° C.

1 - benzyl - 4 - acetamidomethyl - 4 - (4 - tolyl)piperidine hydrochloride melting at about 259–260° C.

1 - benzyl - 4 - propionamidomethyl - 4 - phenylpiperidine melting at about 98–100° C.

1 - benzyl - 4 - (1 - acetamidoethyl) - 4 - phenylpiperidine melting at about 143–144° C.

Example 11

A mixture of 19 parts of 1-benzyl-4-methoxycarbonylaminomethyl-4-phenylpiperidine hydrochloride and 160 parts of ethanol is debenzylated under atmospheric pressure and at room temperature in the presence of 5 parts of a 10% palladium-on-charcoal catalyst. After the calculated amount of hydrogen is taken up, hydrogenation is stopped. The catalyst is filtered off and the solvent is evaporated. A solution of the residue in 150 parts of water is alkalized and extracted with 3 portions of chloroform. The chloroform solution is dried over magnesium sulfate and the solvent is evaporated to leave a residue which is stirred in the cold with 40 parts of diisopropyl ether. The resultant mixture is filtered to give 4-methoxycarbonylaminomethyl-4-phenylpiperidine melting at about 144–148° C.

If equivalent quantities of the appropriate 1-benzylpiperidine are substituted for the 1-benzyl-4-methoxycarbonylaminomethyl-4-phenylpiperidine in the above debenzylation procedure, the following compounds are obtained:

4 - ethoxycarbonylaminomethyl - 4 - phenylpiperidine melting at about 147–148° C.

4 - ethoxycarbonylaminomethyl - 4 - (4 - fluorophenyl)-piperidine melting at about 127–128° C.

4 - ethoxycarbonylaminomethyl - 4 - (3 - tolyl)piperidine melting at about 127.6–130.2° C.

4 - ethoxycarbonylaminomethyl - 4 - (4 - tolyl)piperidine melting at about 135–136.8° C.

4 - propoxycarbonylaminomethyl - 4 - phenylpiperidine melting at about 117–120° C.

4 - isopropoxycarbonylaminomethyl - 4 - phenylpiperidine melting at about 145–146° C.

4-formamidomethyl-4-phenylpiperidine melting at about 125–128.6° C.

4 - acetamidomethyl - 4 - (4 - fluorophenyl)piperidine melting at about 122–126° C.

4 - acetamidomethyl - 4 - (4 - tolyl)piperidine melting at about 157.5–159° C.

Example 12

A mixture of 14 parts of 1-benzyl-4-ethoxycarbonylamino-4-phenylpiperidine hydrobromide and 280 parts of ethanol is debenzylated under atmospheric pressure and at a temperature of about 30° C. with 10 parts of a 10% palladium-on-charcoal catalyst. After the calculated amount of hydrogen is taken up, hydrogenation is stopped. The mixture is filtered and the solvent is evaporated from the filtrate. The residue is stirred in the cold with 160 parts of ether and the resultant precipitate is filtered off to give 4-ethoxycarbonylamino-4-phenylpiperidine hydrobromide melting at about 105–200° C. with decomposition.

If equivalent quantities of appropriate starting materials are substituted in the above debenzylation procedure, the following compounds are obtained:

4 - methoxycarbonylamino - 4 - phenylpiperidine hydrobromide melting at about 202–203° C.

4 - ethoxycarbonylaminomethyl - 4 - phenylpiperidine hydrochloride melting at about 187–200° C. with decomposition.

4 - (1 - ethoxycarbonylaminoethyl) - 4 - phenylpiperidine melting at about 140–143° C.

4-acetamidomethyl-4-phenylpiperidine melting at about 147–147.2° C.

4-acetamido-4-phenylpiperidine.

4 - acetamidomethyl - 4 - (3 - tolyl)piperidine melting at about 143.4–144° C.

4 - propionamidomethyl - 4 - phenylpiperidine melting at about 127–139° C.

4-methoxycarbonylamino-4-(4-iodophenyl)piperidine.

Example 13

A mixture of 4.7 parts of β-chloropropiophenone, 13 parts of 4-ethoxycarbonylaminomethyl-4-phenylpiperidine isolated from its hydrochloride, and 0.1 part of potassium iodide in 120 parts of toluene is stirred and refluxed for 5 hours. The cooled reaction mixture is filtered to remove the precipitate. The filtrate is washed twice with 50 parts of water and the solvent is evaporated from the organic layer. The resultant residue is dissolved in 240 parts of diisopropyl ether and hydrogen chloride gas is introduced into the solution. The ether is decanted and the residue is recrystallized from 2-propanol to give 1-(β-benzoylethyl) - 4 - ethoxycarbonylaminomethyl - 4 - phenylpiperidine hydrochloride melting at about 175–176.5° C. The free base of this compound has the formula

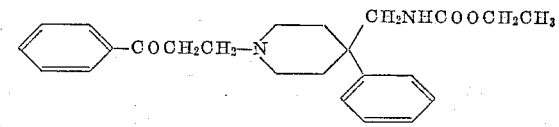

Example 14

A mixture of 4.7 parts of β-chloropropiophenone, 11 parts of 4-acetamidomethyl-4-phenylpiperidine and 120 parts of anhydrous toluene is stirred and refluxed for 5 hours. After cooling to room temperature, the toluene solution is decanted from the separated oil. When the toluene solution is washed with water, a solid separates. The mixture is filtered and the solid is dried to yield 1 - (β - benzoylethyl) - 4 - acetamidomethyl - 4 - phenylpiperidine melting at about 79–83° C. This compound has the following formula:

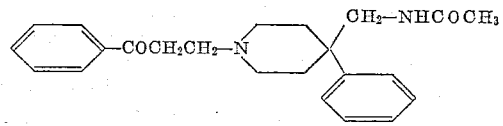

Example 15

A mixture of 5.6 parts of γ-chlorobutyrophenone, 5.1 parts of 4-acetamidomethyl-4-phenylpiperidine, 7 parts of sodium carbonate and 0.1 part of sodium iodide in 128 parts of 4-methyl-2-pentanone is stirred and refluxed for 24 hours. The reaction mixture is filtered hot and the filtrate is cooled at −15° C. The solid which precipitates is filtered off and recrystallized from 4-methyl-2-pentanone to give 1-(γ-benzoylpropyl)-4-acetamidomethyl-4-phenylpiperidine melting at about 151.5–152.5° C.

Example 16

A mixture of 3.2 parts of γ-chloro-4-fluorobutyrophenone, 4 parts of 4-methoxycarbonylamino-4-phenylpiperidine, 3.7 parts of sodium carbonate and 0.1 part of potassium iodide in 120 parts of 4-methyl-2-pentanone is stirred and refluxed for 24 hours. The reaction mixture is filtered, the filtrate is boiled with activated charcoal and filtered and the solvent is evaporated from the resultant filtrate. The residue is dissolved in diisopropyl ether, filtered, and cooled to yield 1-[γ-(4-fluorobenzoyl)propyl]-4-methoxycarbonylamino-4-phenylpiperidine melting at about 136.6–142° C. To obtain the hydrochloride, hydrogen chloride gas is passed through the ether solution of the crude amine and the hydrochloride is filtered off.

If equivalent quantities of the appropriate starting materials are substituted in the above procedure, the following compounds are obtained:

1-[γ-(4-fluorobenzoyl)propyl]- 4 - acetamido-4-phenylpiperidine melting at about 194.6–196° C.

1-[γ-(4-fluorobenzoyl)propyl]-4-ethoxycarbonylamino-4-phenylpiperidine melting at about 99.6–102.4° C.

1-[γ-(4-fluorobenzoyl)propyl]-4-ethoxycarbonylaminomethyl-4-(4-fluorophenyl)piperidine hydrochloride melting at about 130–171° C. with decomposition.

1-[γ-(4-fluorobenzoyl)propyl]-4-acetamidomethyl-4-(4-tolyl)piperidine melting at about 116.6–118.4° C.

1-[γ-(4-chlorobenzoyl)propyl]- 4 - acetamidomethyl-4-phenylpiperidine melting at about 126–127° C.

1-[γ-(2-thenoyl)propyl]-4 - acetamidomethyl-4-phenylpiperidine melting at about 156–157° C. after recrystallization from benzene.

1-[γ-(4-fluorobenzoyl)propyl] - 4 - (1- ethoxycarbonylaminoethyl)-4-phenylpiperidine hydrochloride melting at about 83.8–91° C. after recrystallization from benzene.

1-[γ- (4 - fluorobenzoyl)propyl] - 4 - methoxycarbonylamino-4-(4-iodophenyl)piperidine.

1-[γ-(3-chlorobenzoyl)propyl]- 4 - acetamidomethyl-4-phenylpiperidine.

1-[γ- (4 - iodobenzoyl)propyl] - 4 - acetamidomethyl-4-phenylpiperidine.

*Example 17*

A mixture of 7.7 parts of γ-chloro-4-fluorobutyrophenone, 6.8 parts of 4-methoxycarbonylaminomethyl-4-phenylpiperidine, 8.7 parts of sodium carbonate and 0.1 part of potassium iodide in 160 parts of 4-methyl-2-pentanone is stirred and refluxed for 24 hours. The reaction mixture is filtered and the solvent is evaporated from the filtrate. The residue is dissolved in 320 parts of ether and filtered and hydrogen chloride gas is introduced into the filtrate. The oily hydrochloride is separated, dissolved in 150 parts of water, and alkalized, and the resultant mixture is extracted with toluene. The solvent is evaporated from the dried toluene solution and the resultant residue is dissolved in 240 parts of diisopropyl ether. Introduction of hydrogen chloride gas into the solution precipitates the hydrochloride melting at about 116–195° C. with decomposition. The product is 1-[γ-(4-fluorobenzoyl)propyl]-4-methoxycarbonylaminomethyl-4-phenylpiperidine hydrochloride.

If equivalent quantities of the appropriate starting materials are substituted in the above procedure the following compounds are obtained:

1-[γ-(4-fluorobenzoyl)propyl]-4-ethoxycarbonylaminomethyl-4-phenylpiperidine hydrochloride melting at about 81–106° C. with decomposition. The methiodide of this compound melts at about 208.6–209.2° C.

1-[γ-(4-chlorobenzoyl)propyl]-4-ethoxycarbonylaminomethyl-4-phenylpiperidine hydrochloride melting at about 78–83° C. with decomposition.

1-[γ - (4 - fluorobenzoyl)propyl] - 4 - propoxycarbonylaminomethyl-4-phenylpiperidine hydrochloride melting at about 51–67° C. with decomposition.

1-[γ-(4-fluorobenzoyl)propyl]- 4 - isopropoxycarbonylaminomethyl-4-phenylpiperidine hydrochloride melting at about 75–83° C. with decomposition.

1-[γ-(4 - methoxybenzoyl)propyl] - 4 - ethoxycarbonylaminomethyl-4-phenylpiperidine hydrochloride melting at about 62–81° C. with decomposition.

*Example 18*

A mixture of 5.6 parts of γ-chloro-4-fluorobutyrophenone, 5.5 parts of 4-ethoxycarbonylaminomethyl-4-(3-tolyl)piperidine, 6.36 parts of sodium carbonate and 0.1 part of potassium iodide in 128 parts of 4-methyl-2-pentanone is refluxed for 51 hours. The hot reaction mixture is filtered and the filtrate is boiled with activated charcoal, filtered hot again and the solvent is evaporated. The oily residue is dissolved in 400 parts of anhydrous diisopropyl ether and hydrogen chloride gas is introduced into the solution. The precipitated hydrochloride is filtered off and recrystallized first from 2-propanol and then from 4-methyl-2-pentanone to give 1-[γ-(4-fluorobenzoyl)propyl]-4-ethoxycarbonylaminomethyl-4 - (3-tolyl)piperidine hydrochloride melting at about 141.5–144° C.

*Example 19*

A mixture of 5.6 parts of γ-chloro-4-fluorobutyrophenone, 5.5 parts of 4-ethoxycarbonylaminomethyl-4-(4-tolyl)piperidine, 6.36 parts of sodium carbonate and 0.1 part of potassium iodide in 120 parts of 4-methyl-2-pentanone is stirred and refluxed for 40 hours. The hot reaction mixture is filtered and the filtrate is boiled with activated charcoal and filtered and the solvent is evaporated. The oily residue is dissolved in 240 parts of toluene and hydrogen chloride gas is introduced into the solution. The toluene is then evaporated and the residue is recrystallized 3 times from 4-methyl-2-pentanone to give 1-[γ-(4-fluorobenzoyl)propyl - 4 - ethoxycarbonylaminomethyl - 4 - (4-tolyl)piperidine hydrochloride melting at about 130–133.2° C. This compound has the following formula

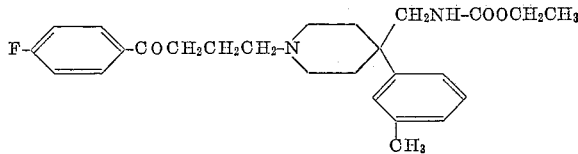

*Example 20*

A mixture of 4.5 parts of 2-(γ-chlorobutyryl)thiophene, 5 parts of 4-ethoxycarbonylaminomethyl-4-phenylpiperidine isolated from its hydrochloride, 5.3 parts of sodium carbonate and 0.1 part of potassium iodide in 120 parts of 4-methyl-2-pentanone is stirred and refluxed for 24 hours. The reaction mixture is filtered and the filtrate is boiled with activated charcoal and filtered and the solvent is evaporated. The residue is dissolved in 40 parts of 2-propanol and a solution of 1.2 parts of oxalic acid dihydrate in 16 parts of 2-propanol is added. The mixture is cooled at room temperature and the precipitated solid is filtered, washed with 2-propanol and dried to give 1-[γ-(2-thenoyl)propyl] - 4 - ethoxycarbonylaminomethyl-4-phenylpiperidine oxalate melting at about 150–153° C.

If an equivalent quantity of γ-chlorobutyrophenone is substituted for the 2-(γ-chlorobutyryl)thiophene in the above procedure, the product is 1-(γ-benzoylpropyl)-4-ethoxycarbonylaminomethyl - 4 - phenylpiperidine oxalate melting at about 152–156° C.

*Example 21*

A mixture of 6.15 parts of γ-chloro-4-fluorobutyrophenone, 4.8 parts of 4-formamidomethyl-4-phenylpiperidine, 7 parts of sodium carbonate and 0.1 part of potassium iodide in 120 parts of 4-methyl-2-pentanone is stirred and refluxed for 42 hours. The cooled reaction mixture is filtered and the solvent is evaporated from the filtrate. The residue is dissolved in 240 parts of diisopropyl ether and filtered and hydrogen chloride gas is introduced into the filtrate. The precipitated hydrochloride is filtered off and dissolved in 200 parts of water. This solution is filtered and the filtrate is washed twice with 80 parts of toluene. The aqueous layer is alkalized and extracted with 3 parts of toluene. The organic layer is then dried over magnesium sulfate and the solvent is evaporated. The residue is recrystallized from ether to give 1-[γ-(4-fluorobenzoyl)propyl]-4-formamidomethyl - 4 - phenylpiperidine melting at about 94.5–96° C. This compound has the formula

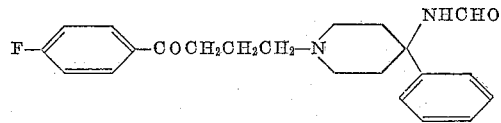

If the above procedure is repeated and an equivalent quantity of the appropriate piperidine is substituted for the 4-formamidomethyl-4-phenylpiperidine, the following compounds are obtained:

1-[γ-(4-fluorobenzoyl)propyl] - 4 - acetamidomethyl-4-phenylpiperidine melting at about 97–100° C.

1-[γ-4-fluorobenzoyl)propyl] - 4 - acetamidomethyl - 4-(3-tolyl)piperidine melting at about 94–100° C.

1-[γ-(4-fluorobenzoyl)propyl] - 4 - (N-methyl)acetamidomethyl-4-phenylpiperidine melting at about 127–130° C.

*Example 22*

A mixture of 3.1 parts of 2-(γ-chlorobutyryl)thiophene, 4 parts of 4-methoxycarbonylamino-4-phenylpiperidine, 3.7 parts of sodium carbonate and 0.1 part of potassium iodide in 120 parts of 4-methyl-2-pentanone is stirred and refluxed for 24 hours. The reaction mixture is filtered and the filtrate is boiled with activated charcoal and filtered. Evaporation of the solvent from the filtrate leaves a residue which is washed first with diisopropyl ether and then with 2-butanone. The solid is dissolved in methanol and the solvent is evaporated. The residue is recrystallized from diisopropyl ether to give 1-[γ-(2-thenoyl)-propyl]-4-methoxycarbonylamino - 4 - phenylpiperidine melting at about 158.5–160° C. This compound has the following formula

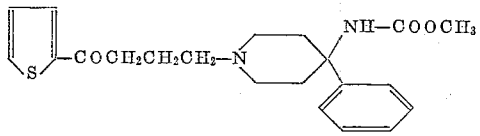

*Example 23*

A mixture of 6.3 parts of γ-chloro-4-fluorobutyrophenone, 6 parts of 4-propionamidomethyl-4-phenylpiperidine, 7.1 parts of sodium carbonate and 0.1 part of potassium iodide in 160 parts of 4-methyl-2-pentanone is stirred and refluxed for 32 hours. The cooled reaction mixture is filtered and the solvent is evaporated from the filtrate. The residue is dissolved in toluene, filtered and extracted with 1 N hydrochloric acid. After washing the aqueous solution once with 80 parts of toluene, it is alkylized and extracted with toluene. The combined organic layers are dried over magnesium sulfate and the solvent is evaporated. The residue is dissolved in 20 parts of 2-propanol and a solution of 2.8 parts of oxalic acid dihydrate in 16 parts of 2-propanol is added. When the mixture is cooled at 0° C. the crude oxalate precipitates. This salt is dissolved in 110 parts of water and the resultant aqueous solution is treated at 70° C. with activated charcoal and filtered. The filtrate is alkalized and extracted with toluene and the solvent is evaporated from the dried toluene layer. The residue is dissolved in 200 parts of ether and hydrogen chloride gas is introduced. The precipitated hydrochloride is filtered off, recrystallized from benzene and dried to give 1-[γ-(4-fluorobenzoyl)propyl]-4-propionamidomethyl-4-phenylpiperidine hydrochloride melting at about 123.6–139° C.

*Example 24*

A mixture of 5.7 parts of γ-chloro-4-fluorobutyrophenone, 5.3 parts of 4-acetamidomethyl-4-(4-fluorophenyl)piperidine, 6.4 parts of sodium carbonate, and 0.1 part of potassium iodide in 160 parts of 4-methyl-2-pentanone is stirred and refluxed for 36 hours. The reaction mixture is filtered and the solvent is evaporated from the filtrate. The residue is dissolved in 240 parts of toluene and hydrogen chloride gas is introduced into the solution. The toluene is evaporated from the solution and the residue is washed with 4-methyl-2-pentanone and then recrystallized from 2-propanol. The resultant product is dissolved in 100 parts of water and washed with tolene. The water layer is separated, alkylized and extracted with toluene. The organic layer is dried over magnesium sulfate and the solvent is evaporated. The residue is recrystallized from a mixture of ether and diisopropyl ether to give 1-[γ-(4-fluorobenzoyl)propyl]-4-acetamidomethyl-4-(4-fluorophenyl)piperidine melting at about 99–100° C.

*Example 25*

A mixture of 6.5 parts of γ-chloro-4-methoxybutyrophenone, 5.1 parts of 4-acetamidomethyl-4-phenylpiperidine, 7 parts of sodium carbonate and 0.1 part of potassium iodide in 128 parts of 4-methyl-2-pentanone is stirred and refluxed for 24 hours. The hot reaction mixture is filtered and the solvent is evaporated from the filtrate. The oily residue is dissolved in 240 parts of toluene and hydrogen chloride gas is introduced to give a sticky hydrochloride. The solvent is evaporated and the residue is dissolved in water and the resultant aqueous solution is alkalized. The mixture is extracted with toluene and, after the toluene solution is dried, the solvent is evaporated. The base is stirred with ether and cooled at 0° C. and filtered. The product is recrystallized first from 24 parts of ethyl acetate and then from 4-methyl-2-pentanone to give 1-[γ-(4-methoxybenzoyl)propyl]-4-acetamidomethyl-4-phenylpiperidine melting at about 116–119.2° C.

*Example 26*

To a stirred mixture of 5.8 parts of 4-acetamidomethyl-4-phenylpiperidine, 8 parts of sodium carbonate and 0.1 part of potassium iodide in 104 parts of 4-methyl-2-pentanone is added portionwise a solution of 6.9 parts of δ-chlorovalerophenone in 24 parts of 4-methyl-2-pentanone. When the addition is complete the mixture is stirred and refluxed for 24 hours. 70 parts of water is added to the cooled reaction mixture and the organic layer is separated, dried over magnesium sulfate and the solvent is evaporated. The residue is dissolved in 56 parts of toluene and this solution is extracted with dilute hydrochloric acid. The acidic aqueous solution is washed twice with 24 parts of toluene, alkalized with 40% sodium hydroxide solution and extracted with benzene. The organic layer is dried over magnesium sulfate and the solvent is evaporated. The oily residue is triturated in 24 parts of ether to give 1-(δ-benzoylbutyl)-4-acetamidomethyl-4-phenylpiperidine melting at about 95–99° C.

What is claimed is:

1. A compound of the formula

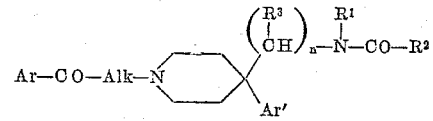

wherein Ar is a member of the class consisting of phenyl, halophenyl, methoxyphenyl, and thienyl; Ar' is a member of the class consisting of phenyl, halophenyl, and tolyl; Alk is an alkylene radical of from 2 to 4 carbon atoms inclusive; $R^1$ and $R^3$ are members of the class consisting of hydrogen and methyl; $R^2$ is a member of the class consisting of hydrogen, lower alkyl and lower alkoxy containing less than 7 carbon atoms; and $n$ is an integer between 0 and 1 inclusive.

2. A compound of the formula

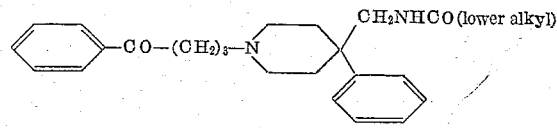

3. A compound of the formula

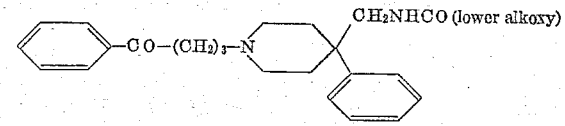

4. A compound of the formula
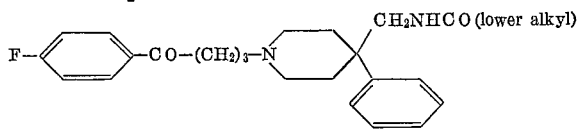
5. 1-[δ-(4-fluorobenzoyl)propyl]-4-acetamidomethyl-4-phenylpiperidine.
6. A compound of the formula
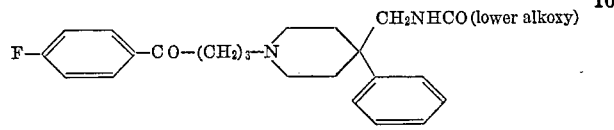
7. 1-[γ-(4-fluorobenzoyl)propyl]-4-ethoxycarbonyl-aminomethyl-4-phenylpiperidine.
8. 1-[γ-(4-fluorobenzoyl)propyl]-4-methoxycarbonyl-aminomethyl-4-phenylpiperidine.
9. A compound of the formula
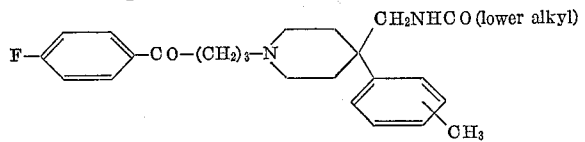
No references cited.